(12) United States Patent
Oda et al.

(10) Patent No.: US 6,456,617 B1
(45) Date of Patent: Sep. 24, 2002

(54) ROUTING CONTROL COMMUNICATION SYSTEM BETWEEN CIRCUIT SWITCHED NETWORK AND INTERNET

(75) Inventors: Toshikane Oda, Fujimi; Hideaki Yamada, Tokyo; Hikaru Yagi, Asaka; Hiroto Masaki, Tokyo, all of (JP)

(73) Assignee: Kokusai Denshin Denwa Co., Ltd., Tokyo (JP)

( * ) Notice: Subject to any disclaimer, the term of this patent is extended or adjusted under 35 U.S.C. 154(b) by 0 days.

(21) Appl. No.: 09/132,262

(22) Filed: Aug. 11, 1998

(30) Foreign Application Priority Data

Aug. 12, 1997 (JP) .............................. 9-228965

(51) Int. Cl.⁷ .......................... H04L 12/46; H04L 12/66
(52) U.S. Cl. ........................ 370/352; 370/401; 370/410
(58) Field of Search ................................ 370/352, 355, 370/356, 400, 401, 410; 709/218, 249

(56) References Cited

U.S. PATENT DOCUMENTS

| | | | |
|---|---|---|---|
| 5,737,333 A | * 4/1998 | Civanlar et al. | ............ 370/352 |
| 6,157,636 A | * 12/2000 | Voit et al. | .................... 370/353 |
| 6,215,790 B1 | * 4/2001 | Voit et al. | .................... 370/401 |
| 6,289,094 B1 | * 9/2001 | Miloslavsky | ................. 379/220 |
| 6,327,258 B1 | * 12/2001 | Deschaine et al. | .......... 370/356 |

OTHER PUBLICATIONS

International Publication No. WO 97/16007; published May 1, 1997.
International Publication No. WO 96/38018; published Nov. 28, 1996.
International Publication No. WO 97/14238, published Apr. 17, 1997.

* cited by examiner

*Primary Examiner*—Min Jung
(74) *Attorney, Agent, or Firm*—Arent Fox Kintner Plotkin & Kahn, PLLC (57) ABSTRACT

A routing control communication system includes a circuit switched network provided with a service control information database having a telephone numbers table, an interconnection network provided with a network communication protocol and an information terminal, and a network interworking equipment provided with one terminal connected with the circuit switched network and the other terminal connected with the interconnection network. The information database is connected with the interconnection network, and the information terminal of the interconnection network is constituted so as to obtain a transferred terminal number corresponding to a called telephone number from the service control information database.

10 Claims, 4 Drawing Sheets

| REFERENCE NUMBER S (1) | CLASSIFICATION CODE S (2) | FIRST INFORMATION PART S (3) | SECOND INFORMATION PART S (4) | ...... | Nth INFORMATION PART S (N-2) |

ROUTING CONTROL COMMUNICATION SYSTEM BETWEEN CIRCUIT SWITCHED NETWORK AND INTERNET

FIELD OF THE INVENTION

The present invention relates to a communication system performing routing control between circuit switched network and interconnection network comprising protocol for network communication.

DESCRIPTION OF THE RELATED ART

ITU-T Recommendation H.323 may be utilized as a protocol for call control in an interconnection network (hereinafter called as internet) having network communication protocol like LAN, WAN or the Internet based on the IP networking technique. H.323 includes Q.931 protocol which is used as a call control signaling for establishing and releasing calls among terminal equipment and gateways in the internet, where the gateway is an equipment which interconnects between a call in the circuit switched network such as telephone networks, integrated services digital networks and mobile communication networks and a call in the internet. The network architecture in the H.323 includes a gatekeeper which performs functions of address translation, access control, bandwidth management, etc. The gatekeeper may have additional functions relating to the call control such as a conference call control.

In many cases, a public switched telephone network is constructed as Intelligent Network (IN) in order to provide enhanced and diversified network service. The IN is a network connection architecture recommended in Q.1200 series of ITU-T. Difference between conventional network and the IN are two points of independence and integration of the service control function from the switching equipment.

An aim of the conventional telephone switching system is to efficiently provide one to one communication services. However, in order to provide the service control function to each switching equipment, complex addition and modification on the function are required. Therefore, advancing of services is somewhat limited. The IN solves this problem by constructing a layered structure such that the switching equipment executes a basic call connection function and a dedicated information processing equipment executes a function for providing complex services. According to the IN, a service control function needed for realization, maintenance and operation of the network services is integrated and controlling, monitoring and managing of the call control part are performed so as to meet an introduction of advanced network services. Additional services such as freephone service, abbreviated dialing service, virtual private network service and transfer service are realized with the IN technique.

Figures 1, 1A:
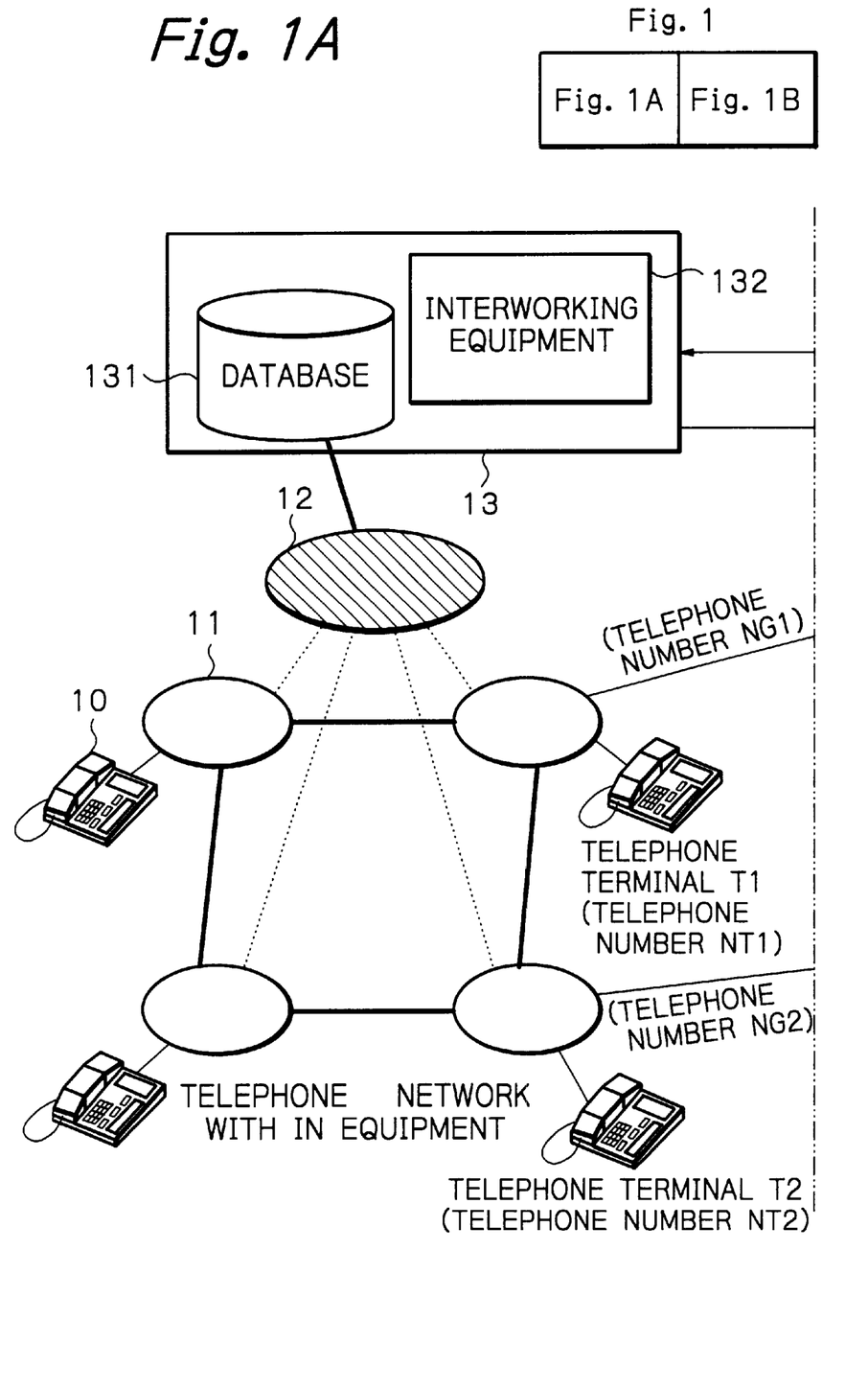
Figure 1B:
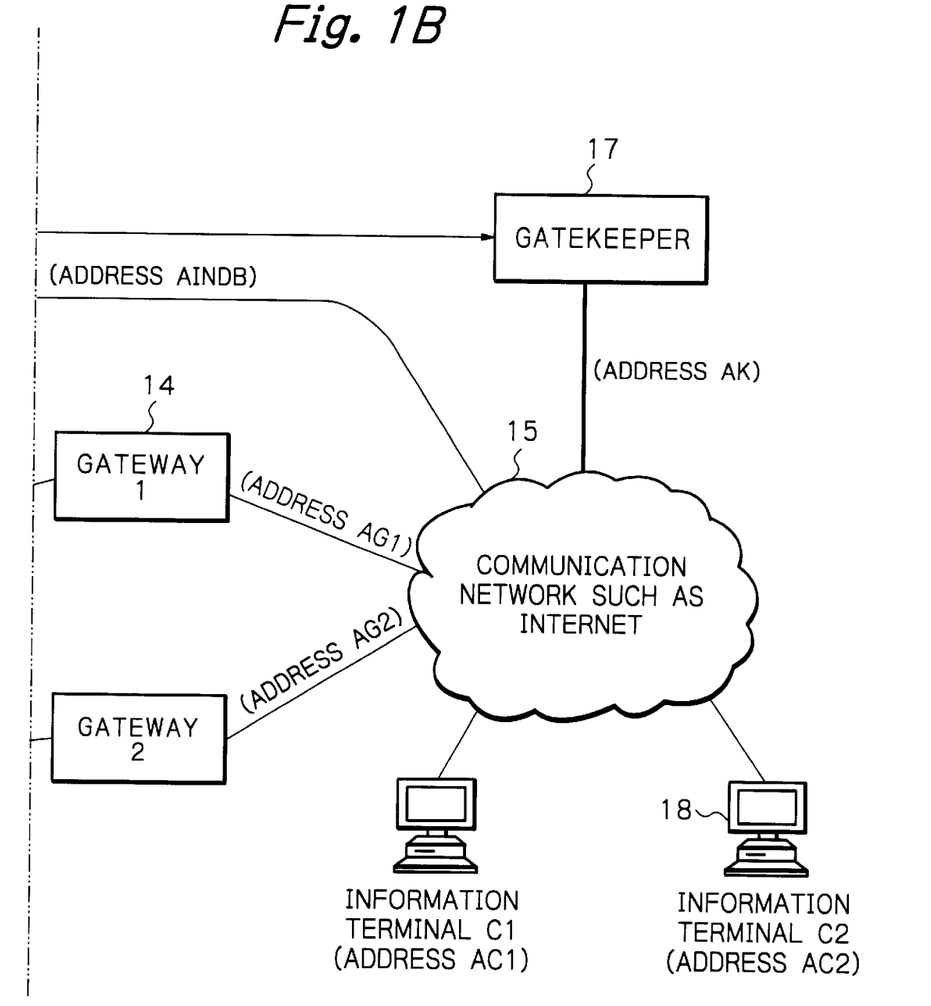

A part of structure of IN can be seen in FIG. 1. In the figure, a call control part 11 for performing only basic connection of a circuit such as a digital switching system, a service control part 12 for directing the service to the call control part 11, and a service control information database 13 for storing service control information are illustrated.

In a PBX and a private communication network composed mainly with dedicated line, these additional services are realized by adding a service control function to a server equipment connected to the PBX.

However, when a call for connecting to a telephone terminal in a telephone network is originated from an information terminal of the internet, it is not sure that the nearest gateway with respect to the called telephone terminal is always selected. The longer in distance between a selected gateway and the called telephone terminal, the less efficient use of communication resources due to wasteful routing. This invites an inconvenience to users in paying increased charge to the telephone networks.

Hitherto, the internet provides gatekeeper. When a call from an information terminal C1 of the internet to a telephone terminal T1 of the telephone network is arrived, the information terminal C1 inquires to the gatekeeper and thus the gatekeeper responds by retrieving a gateway address AG1 for the called telephone number NT1. Therefore, the gatekeeper has an address table to take the correspondence between the telephone number and the address of the gateway used to connect to the telephone number. The routing control can be thus performed by selecting the address of nearest gateway depending upon the called telephone number informed from the calling information terminal. However, for the Internet continuing self-increase, it is difficult to always renew the correspondence information in the gateway between the address of the gateway and the telephone number. Therefore, the inconvenience comes out from that communication resources cannot use efficiently for wasteful routing as mentioned above.

More concretely, an inconvenience may come out in case of usage of the call transfer service. For example, it is assumed that there is a service for transferring a calling to a telephone terminal T1 of the telephone network to an information terminal C2 of the internet is set, and that an information terminal C1 of the internet originates a call to the same telephone terminal T1 of the telephone network through the gateway. In this case, the service control part of the telephone switching system, which detects that the telephone terminal T1 is called, needs to execute a procedure for terminating the call to the information terminal C2 by transferring again the call into the internet through the gateway. Such wasteful procedure between the networks will produce further consumption of the communication resources. This problem is caused by that the one communication network has only information for call transfer to the other communication network. The similar problem will occur in case that a mobile terminal equipment to be called in the mobile communication network is roaming when a call is arrived to the mobile communication network from the internet.

Furthermore, even in case that a call to an information terminal of the internet is originated from a telephone terminal of the telephone network, it is not sure that the nearest gateway with respect to the called telephone terminal is surely selected.

SUMMARY OF THE INVENTION

It is therefore an object of the present invention to provide a communication system to embody the routing control using communication resources efficiently, at calling from one network to other network, in the network connection between a telephone network and internet.

According to the present invention, a routing control communication system includes a circuit switched network provided with a service control information database having a telephone numbers table, an interconnection network provided with a network communication protocol and an information terminal, and a network interworking equipment, such as a gateway, provided with one terminal connected with the circuit switched network and the other terminal connected with the interconnection network. The information database is connected with the interconnection network, and the information terminal of the interconnection network is constituted so as to obtain a transferred terminal number corresponding to a called telephone number from the service control information database.

Thus, when calling to the telephone terminal of the circuit switched network from the information terminal in the interconnection network, the information terminal can inquire directly whether there is a transferred terminal number corresponding to a called telephone number in the service control information database of IN facility. In case that the transferred terminal number corresponds to a telephone number (E.164) of the circuit switched network, it is possible to transfer the call to the address of an optimum gateway. Whereas, in case that the. transferred terminal number is an address of the interconnection network, it is possible to send a call directly to the address.

It is preferred that the information terminal of the interconnection network for obtaining the terminal number to be transferred includes a memory unit for storing relationship information between the received called telephone number and the transferred terminal number. Consequently, an information terminal is not necessary to inquire again to the same called telephone number. Since, however, the obtained information may become incorrect and thus the use of the information as a permanent one may cause misaddressing, then it is desired to use a cache memory for temporary storage of the information.

It is also preferred that the transferred terminal number identifies a telephone number of a circuit switched network, or an address of the interconnection network. It is possible to call the address of corresponding gateway if it is the telephone number of the circuit switched network. It is possible to directly call the address if it is the address of the interconnection network.

It is further preferred that the information terminal of the interconnection network for obtaining the transferred terminal number is a gatekeeper having an address table of the interconnection network, and that the service control information database is constituted so as to obtain from the gatekeeper a telephone number of a transferred gateway which corresponds to a called address. The routing control communication system which efficiently uses communication resources can be realized by communicating with each other for the service control information database having the telephone number table and the gatekeeper having the address table.

It is also preferred that a plurality of gateway telephone numbers to be transferred are obtained from the gatekeeper, simultaneously. Thus, the telephone network can select automatically with high priority gateway from the view point of quality service.

It is preferred that an interworking equipment is connected to the service control information database, and that the interworking equipment performs mutual signal exchange for enquiry/response signals. Thus, it is possible to use an existing IN facility or gatekeeper for a role of protocol conversion between the service control information database and the gatekeeper.

Preferably, the interworking equipment includes a memory unit for storing information relating to mutual signal exchange of enquiry/response signals.

It is also preferred that the circuit switched network includes an IN facility. Thus, since the service control information database can be separated from the switching equipment which is a call control part, the invention can be easily realized.

It is further preferred that the network control equipment is a gateway.

Further objects and advantages of the present invention will be apparent from the following description of the preferred embodiments of the invention as illustrated in the accompanying drawings.

BRIEF DESCRIPTION OF THE DRAWINGS

FIG. 1, which is constituted by combining FIGS. 1A and 1B, shows a schematic diagram of an interwork routing control system between telephone network and internet as a preferred embodiment according to the present invention;

DESCRIPTION OF THE PREFERRED EMBODIMENTS

FIG. 1 shows a functional diagram of routing control communication system between a telephone network and an internet as a preferred embodiment according to the present invention.

In addition to the IN facility aforementioned on the telephone network, a telephone terminal T1 provided with telephone number NT1 and a telephone terminal T2 provided with telephone number NT2 are depicted. A service control information database 131 and an interworking equipment 132 are both shown as in a service database equipment 13. Inside of internet 15, a gatekeeper 17 provided with address AK, an information terminal C1 provided with an address AC1 and an information terminal C2 provided with an address AC2 are shown in each other. Moreover, for the object of connecting a telephone network and the internet, a gateway 1 having a telephone number NG1 and an address AG1, and a gateway 2 having a telephone number NG2 and an address AG2 are shown.

Figure 2:
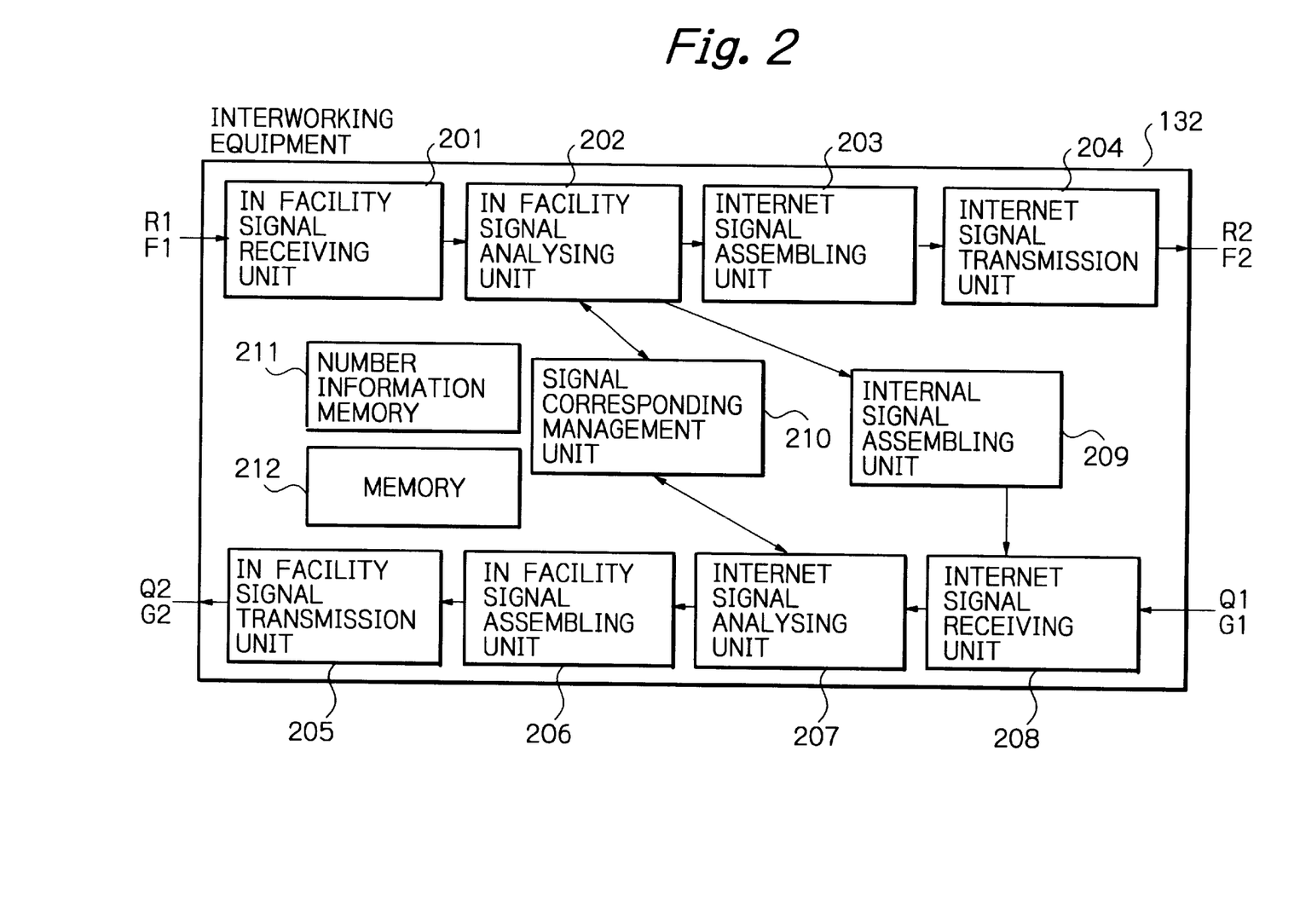
FIG. 2 shows a schematic diagram of interworking equipment in the embodiment of FIG. 1.
Figure 3:
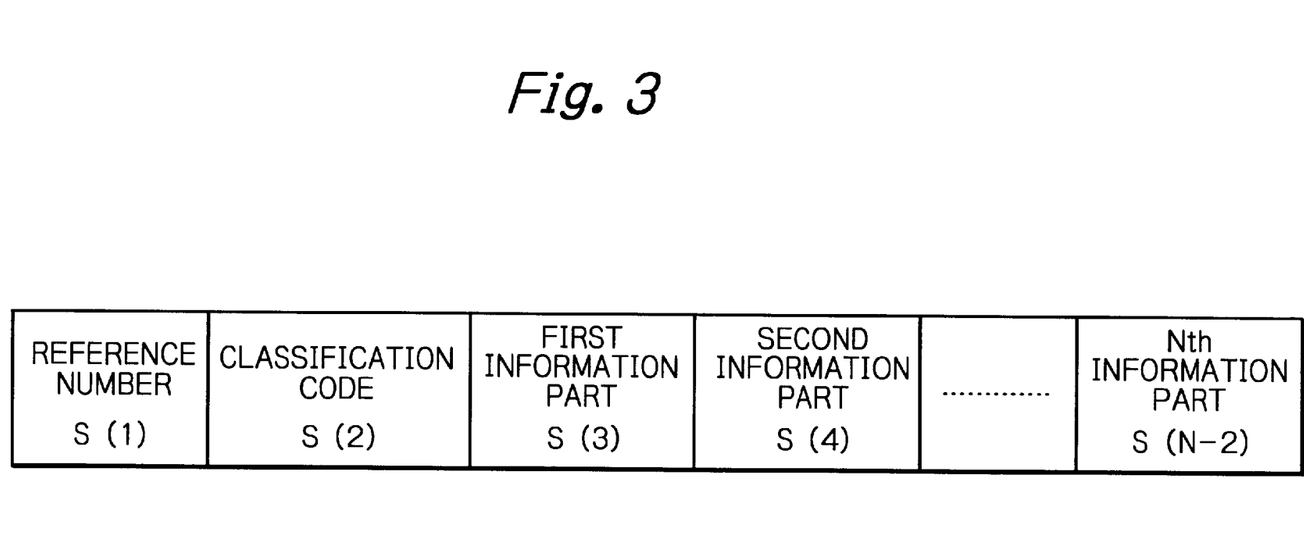
FIG. 3 shows a signal arranging diagram through the interworking equipment in the embodiment of FIG. 1.

FIG. 2 shows functional diagram of the interworking equipment in the embodiment of FIG. 1, and FIG. 3 shows an execution format of signal information to be sent/received through the interworking equipment in the embodiment of FIG. 1. Operations of the interworking equipment in FIG. 2 is hereinafter illustrated by using signal information of FIG. 3.

The signal format of communicating with the interworking equipment is as follows;

S(1) [reference number]
S(2) [classification code]
S(3) [first information part]
S(4) [second information part]
S(N-2) [Nth information part].

The interworking equipment includes a conversion function for back/force depending on inquire/response of telephone number and address. In this embodiment, this is installed within the IN facility. In other embodiments, the interworking equipment may be implemented separately from the IN facility with having a communication link between the equipment and the IN facility.

The interworking equipment between the IN facility and the gatekeeper performs as following two cases;

(1) In case that the gatekeeper obtains the transferred terminal number for called telephone number from the service database equipment of the IN facility, and (2) In case that the service database equipment of the IN facility obtains the group of transferred gateway telephone number for called address from the gatekeeper.

Detailed explanations on these case as follows.

According to the invention, the equipment of internet side may be only the information terminal or the gatekeeper. Whichever performance is similar, then the description will be done with gatekeeper.

(1) In case that the gatekeeper obtains the transferred terminal number for called telephone number from the service database equipment of the IN facility.

FIG. 2 shows that in the interworking equipment 132, an inquiring signal Q1 having called telephone number is supplied as input from the gatekeeper and its conversion signal Q2 is supplied as output to the IN facility. And then, response signal R1 for the inquiring signal Q1 is supplied as input from the IN facility and its conversion signal R1 is supplied as output to the gatekeeper.

The inquiring signal Q1 is received at an internet signal receiving unit 208. The signal receiving unit 208 sends the inquiring signal Q1 to an internet signal analyzing unit 207. The signal analyzing unit 207 analyses contents of the inquiry. The inquiring signal Q1 is sent to an IN facility signal assembling unit 206, and the signal assembling unit 206 composes the corresponding signal Q2 of the IN facility for indicating to the IN facility. The signal formats of the inquiring signal Q2 are as follows:

Q2(1) [reference number]=Identifying number for inquiry,

Q2(2) [classifying code]=Conversion inquiry for telephone number,

Q2(3) [first information part]=Called telephone number.

In case that a signal is directly sent to a service control part of the IN facility, a signal with a signal format depending on the Intelligent Network Application Protocol (INAP) and communication with the procedure of the INAP is executed, or a signal with a signal format depending on the Transaction Capabilities Application Part (TCAP) and communication with the procedure of the INAP is executed. On the other hand, it enables to communicate with existence communication procedures different from these ones. The signal Q2 composed like this is sent to an IN facility signal transmission unit 205 and outputted to the service control information database in the IN facility.

At this time, the internet signal analyzing unit 207 sends the received inquiring signal Q1 to a signal corresponding management unit 210, and the signal corresponding management unit 210 memorizes in a memory 212 for the advising contents.

The service control information database retrieves the called telephone number T1 for the inquiring signal Q2, and sends the response signal R1 provided with retrieved transferred terminal number to the interworking equipment 132. The transferred terminal number is the telephone number in case of telephone network, or is an address in case of the internet.

An IN facility signal receiving unit 201 of the interworking equipment 132 receives the response signal R1 from IN facility and sends it to an IN facility signal analyzing unit 202. The IN facility signal analyzing unit 202 analyses contents of response signal R1. At this time, by inquiring to the signal corresponding management unit 210 to obtain a reference number and by comparing the obtained reference number with a reference number in the responding signal R1, it is confirmed that the responding signal R1 is a corresponding response to the inquiring signal Q1. After the confirmation, the IN facility signal analyzing unit 202, in order to advice the signal R2 as the response information for the gatekeeper, forms the response information in the signal formats as follows:

R2(1)=Q1(1),

R2(2)=Telephone number conversion response,

R2(3)=Called telephone number,

R2(4)=Transferring terminal number. The unit 202 sends these response signal R2 to an internet signal assembling unit 203.

The internet signal assembling unit 203 composes the response signal R2 to be sent to the gatekeeper and sends it to an internet signal transmission unit 204. The internet signal transmission unit 204 sends a received response signal R2 to the gatekeeper.

The gatekeeper 17, that receives the response signal R2, obtains transferred terminal number. In case that there is difference between the called telephone number and transferred terminal number, the gatekeeper 17 retrieves an address table based on this transferred telephone number. The gatekeeper 17 obtains an address of the gateway, if the transferred terminal number would be the telephone number. After that, the gatekeeper 17 sends the obtained address to the calling information terminal C1.

The service database equipment 13 of the IN facility can connect to the internet with an address AINDB. As a result, The equipment 13 can perform accessing from, not only the gatekeeper 17 but also any all information terminals in the internet. In moreover, the equipment 13 enables to compose such as the cache for corresponding table with the called telephone number obtained and the transferred terminal number.

Hereinafter, from the point of view of total communications, the sequence will be explained at case of calling from the information terminal C1 of the internet. Information terminal C1 inquires the telephone number or the address as the called terminal number for the gatekeeper 17. If it is judged in the gatekeeper 17 that the called terminal number is the telephone number, it inquires within the service database equipment 13 by including previously mentioned inquiring signal Q1 with the called telephone number. From the responding signal R2, a transferred terminal number corresponding to the called telephone number can be obtained. For instance, if it would be settled in the service control information database 131 that the call to the telephone terminal T1 is to transfer to information terminal C2, the address of the information terminal C2 is included in the responding signal as the transferred terminal number. The gatekeeper 17 which received the responding signal can advice the transferred address to the information terminal C1. If it is settled in the service control information database 131 so that the call to the telephone terminal T1 is to transfer to the telephone terminal T2, the telephone number of the telephone terminal T2 is included in the responding signal as the transferred terminal number.

The similar functions are needed in case of call connection in which called telephone number is converted as in freephone service and VPN service. That is, in case that practical called terminal is to be identified with the internet address as information terminal C1, an originating switching equipment has to obtain a telephone number of the gateway for information terminal C1 to be identified with transferred address.

If there are requirement conditions for setting that a communication route through the internet is to be modified by quality or else, it is needed to have a function to select optimum gateway from the internet address.

(2) In case that the service database of IN facility obtains transferred gateway telephone number group corresponding called address from the gatekeeper.

FIG. 2 shows that, in the interworking equipment 132, the inquiring signal F1 provided with a transferred address is inputted from the IN facility and its conversion signal F2 is outputted for the gatekeeper. Also, the response signal G1 for the inquiring signal F1 is inputted from the IN facility and its conversion signal G2 is outputted for the IN facility.

The service control part 12 of the IN facility which receives an inquiry relating to called telephone number X1 from the switching equipment generating a call obtains the transferred address Y1 of the called telephone number from the record in the service control information database 131. The service control part 12 composes the inquiring signal F1 for the gateway telephone number including address Y1, and sends the signal F1 to the interworking equipment 132.

The inquiring signal F1 is received with the IN facility signal receiving unit 201 in the interworking equipment 132. The signal receiving unit 201 sends the inquiring signal F1 for the IN facility signal analyzing unit 202. The signal analyzing unit 202 analyzes the contents of the signal F1, and then discriminate its inquiring contents. The signal analyzing unit 202, moreover, composes the inquiring signal F2 of the gateway telephone number to the address Y1 for the gatekeeper of the internet indicating the internet signal assembling unit 203.

The assembling unit 203 composes of the following inquiring signal F2;

F2(1)=reference number,

F2(2)=gateway telephone number inquiring,

F2(3)=transferred address Y1.

The signal F2 is transmitted to the internet signal transmission unit 204, and is outputted to the gatekeeper 17.

The gatekeeper 17 identifies that it should be inquiry about the gateway telephone number from the discriminating code of F2(2) when receiving the inquiring signal F2.

The gatekeeper 17 has the correspondence table between the address and the gateway telephone number. The correspondence table is administrated within the internet, and the correspondence between the address and the gateway telephone number is used to modify properly depending upon the internal status of the internet, network topology and circuit bandwidth. The gatekeeper 17 then retrieves the contents of the correspondence table with the inquiry signal F2 and obtains the gateway telephone number Z1(m) corresponding with the address Y1. The gateway telephone number Z1(1, 2, ..., M) includes plural gateway telephone numbers and hereupon, Z1(m) shows mth candidate for telephone number.

The gatekeeper sends obtained gateway telephone number group Z1(1, 2, .., M) to the interworking equipment 132. The response signal G1 are composed as following;

G1(1)=reference number

G1(2)=gateway telephone number corresponding,

G1(3)=address Y1,

G1(4)=obtained gateway telephone number group Z1(1, 2, ..., M).

The response signal G1 from the gatekeeper 17 is received at the internet signal receiving unit 208 of the interworking equipment 132, and is transmitted to the internet signal analyzing unit 207. The signal analyzing unit 207 analyzes the contents of the received response signal G1, obtains reference number with inquiring for the signal correspondent administration unit 210, compares the obtained reference number with reference number included in the response signal G1, and confirms to be corresponding response to the inquiring signal F1. After that, the unit 207 discriminates to be the response for inquiry from the identifying code of G1(2). Then, in order to notify to the IN facility of inquiring source the contents, obtained gateway telephone number group Z1(1, 2, ..., M), responding to the inquiring signal F1, it directs to the IN facility signal transmission unit 205 so as to compose a signal G2 and to transmit the composed signal G2.

The signal transmission unit 205 sends the response signal G2 including the gateway telephone number group Z1(1, 2, ..., M) to the IN facility.

The IN facility receives the response signal G2 and it obtains the gateway telephone number group Z1(1, 2, .., M) for the address Y1 from its contents. In a consequence, the IN facility recognizes the gateway group to be connected, and informs to the generating source switching equipment for the gateway telephone number group Z1(1, 2, ..., M) or the one of the gateway telephone number Z1(m) and address Y1.

The generating source switching equipment, at receiving this information, selects the one from received gateway telephone number group Z1(1, 2, ..., M), and together with proceeding the arrange for connecting to the gateway of its number, the address Y1 of called terminal is informed to the gateway with indicating on the information element of the call connection control signal.

The gateway which has received the call connection signal for a call, reads out the address Y1 of called terminal indicating on the information element of the call connection control signal, and connects the call to the called terminal of the internet.

In the above-mentioned procedure, the call connection based on the called number X1 of the call completes at all. The gateway corresponding first number Z1(1) of the gateway telephone number group Z1(1, 2, .. , M) is nearest gateway for called terminal on the transmission delay within the internet. Thus, if the calling source switching equipment would be set such as to select its gateway in priority, it should be enable to select in automatically a connection route with the smallest signal delay in the internet.

In the above mentioned embodiment, described is in case of using the IN facility. However, it is possible to inquire, by the similar protocol as mentioned above, a called telephone number T3 to the database equipment of some specified private communication network. In this case, the IN facility signal assembling unit 206, the IN facility signal transmission unit 205 and the IN facility signal receiving unit 201 should possess functions of transmitting/receiving of an information depending on the communication procedure to communicate with the database equipment in the private communication network.

If the called telephone number T1 is a number using freephone service and the transferred telephone number T2 which is obtained by using the IN facility is the terminal logic number registered in the mobile communication network, the interworking equipment 132 according to the present invention inquires the transferred telephone number T2 to the number conversion database equipment of the home mobile communication network so that the called terminal inquires for the transferred telephone number T3 to the roaming mobile communication network.

In this case, the interworking equipment 132 according to the present invention holds the telephone number classified information table, as shown in Table 1, in the number information memory 211.

TABLE 1

| NUMBER CLASSIFICATION | SERVICE CLASSIFICATION |
|---|---|
| 0 1 2 0 x x x x x x | FREEPHONE SERVICE NUMBER |
| 0 9 9 0 x x x x x x | INFORMATION SERVICE NUMBER |
| 0 3 0 x x x x x x x | MOBILE COMMUNICATION NETWORK SUBSCRIBER'S NUMBER |
| . | . |
| . | . |
| . | . |

The IN facility signal analyzing unit 202, when obtaining the transferred telephone number T2, refers the telephone number classified information table in the number information memory, and checks that [the called number T1 is equal to the number using freephone service] and [the transferred telephone number T2 is equal to the terminal logic telephone number registered in mobile communication network]. The IN facility signal analyzing unit 202, when it is judged that the above-mentioned conditions are satisfied, directs to the internal signal assembling unit 209 to execute process of the inquiry again. The directed signal assembling unit 209 composes new inquiry signal Q3 as follows;

Q3(1)=the reference number,

Q3(2)=telephone number inquiry,

Q3(3)=transferred telephone number T2. Then, the signal assembling unit 209 transmits an inquiry signal Q3 to the internet signal receiving unit 208. Thus, the aforementioned protocol for telephone number conversion is executed so that the interworking equipment 132 obtains new transferred telephone number T3.

In case that the interworking equipment according to the present invention is realized in the gatekeeper, it is possible to use the bus in the gatekeeper equipment.

According to the present invention, it is possible to efficiently use communication resources at setting up the route of the call connection between the interconnection network having network communication protocol and circuit switched network. For instance, it is possible to inquire to the service control information database of the IN facility, whether there is a transferred terminal number for called telephone number or not. In case that the transferred terminal number is the telephone number, it is possible to transfer for telephone number of optimum gateway. If transferred terminal number is an address of a interconnection network, it is possible to call directly for prescribed address. In short, it is not to pay for useless communication cost.

If the gatekeeper having address table is connected with the internet, it is possible to embody the routing control of communication systems using communication resources efficiently by mutual communicating with service control information database provided with telephone number table. It is not necessary to administrate for network information of each other, by performing of inquiry/response for table information with between both, and then it is not needs for complexity of communication systems. Also, for a role of protocol conversion on the service control information database and the gatekeeper, it is possible to use for existing IN facility and the gatekeeper. Besides, as the transferred gateway in communications, it is possible to select the available gateway for the route of quality agreed with needs of communication user for called terminal and communication route.

The network routing control communication systems according to the present invention with special structure mentioned above can offer special effects for communication enterpriser, service provider and user.

Many widely different embodiments of the present invention may be constructed without departing from the spirit and scope of the present invention. It should be understood that the present invention is not limited to the specific embodiments described in the specification, except as defined in the appended claims.

What is claimed is:

1. A routing control communication system comprising:

a circuit switched network including a plurality of telephone terminals and a service control information database provided with a telephone number table for storing telephone numbers of the respective telephone terminals and for corresponding between the telephone numbers of the telephone terminals and their call-transfer telephone numbers or addresses indicating other telephone numbers or addresses of the respective telephone terminals, to which incoming calls are to be transferred;

an internet protocol network including a plurality of data terminals and a gatekeeper provided with an address table for storing addresses of the respective data terminals;

a plurality of gateways connecting between said circuit switched network and said internet protocol network, said address table in said gatekeeper further storing addresses of the respective gateways and correspondence between telephone numbers of the telephone terminals and the addresses of the gateways to be used to connect the data terminals with the telephone terminals; and an interworking equipment connecting between said service control information database in said circuit switched network and said gatekeeper in said internet protocol network so that said gatekeeper obtains a call-transfer telephone number or address corresponding to a telephone number called from the data terminal, using said telephone number table in said service control information database.

2. The system as claimed in claim 1, wherein the call-transfer telephone number or address obtained by said gatekeeper is a telephone number of a telephone terminal in said circuit switched network.

3. The system as claimed in claim 1, wherein the call-transfer telephone number or address obtained by said gatekeeper is an address of a data terminal in said internet protocol network.

4. The system as claimed in claim 1, wherein said interworking equipment performs mutual signal exchange for inquiry/response signals.

5. The system as claimed in claim 4, wherein said interworking equipment includes a memory means for storing information relating to the mutual signal exchange for inquiry/response signals.

6. The system as claimed in claim 1, wherein said circuit switched network includes an Intelligent Network.

7. A routing control communication system comprising:

a circuit switched network including a plurality of telephone terminals and a service control information database provided with a telephone number table for storing telephone numbers of the respective telephone terminals and for corresponding between the telephone numbers of the telephone terminals and their call-transfer telephone numbers or addresses indicating other telephone numbers or addresses of the respective telephone terminals, to which incoming calls are to be transferred;

an internet protocol network including a plurality of data terminals and a gatekeeper provided with an address table for storing addresses of the respective data terminals;

a plurality of gateways connecting between said circuit switched network and said internet protocol network, said address table in said gatekeeper further storing identification numbers of the respective gateways and correspondence between addresses of the data terminals and the identification numbers of the gateways to be used to connect the telephone terminals with the data terminals; and an interworking equipment connecting between said service control information database in said circuit switched network and said gatekeeper in said internet protocol network so that said service control information database obtains at least one identification number of at least one gateway to be used to connect the telephone terminal with the data terminal, using said address table in said gatekeeper.

8. The system as claimed in claim 7, wherein said interworking equipment performs mutual signal exchange for inquiry/response signals.

9. The system as claimed in claim 8, wherein said interworking equipment includes a memory means for storing information relating to the mutual signal exchange for inquiry/response signals.

10. The system as claimed in claim 7, wherein said circuit switched network includes an Intelligent Network.

* * * * *